(No Model.)
C. THOMAS.
TWO WHEELED VEHICLE.
No. 249,730. Patented Nov. 15, 1881.
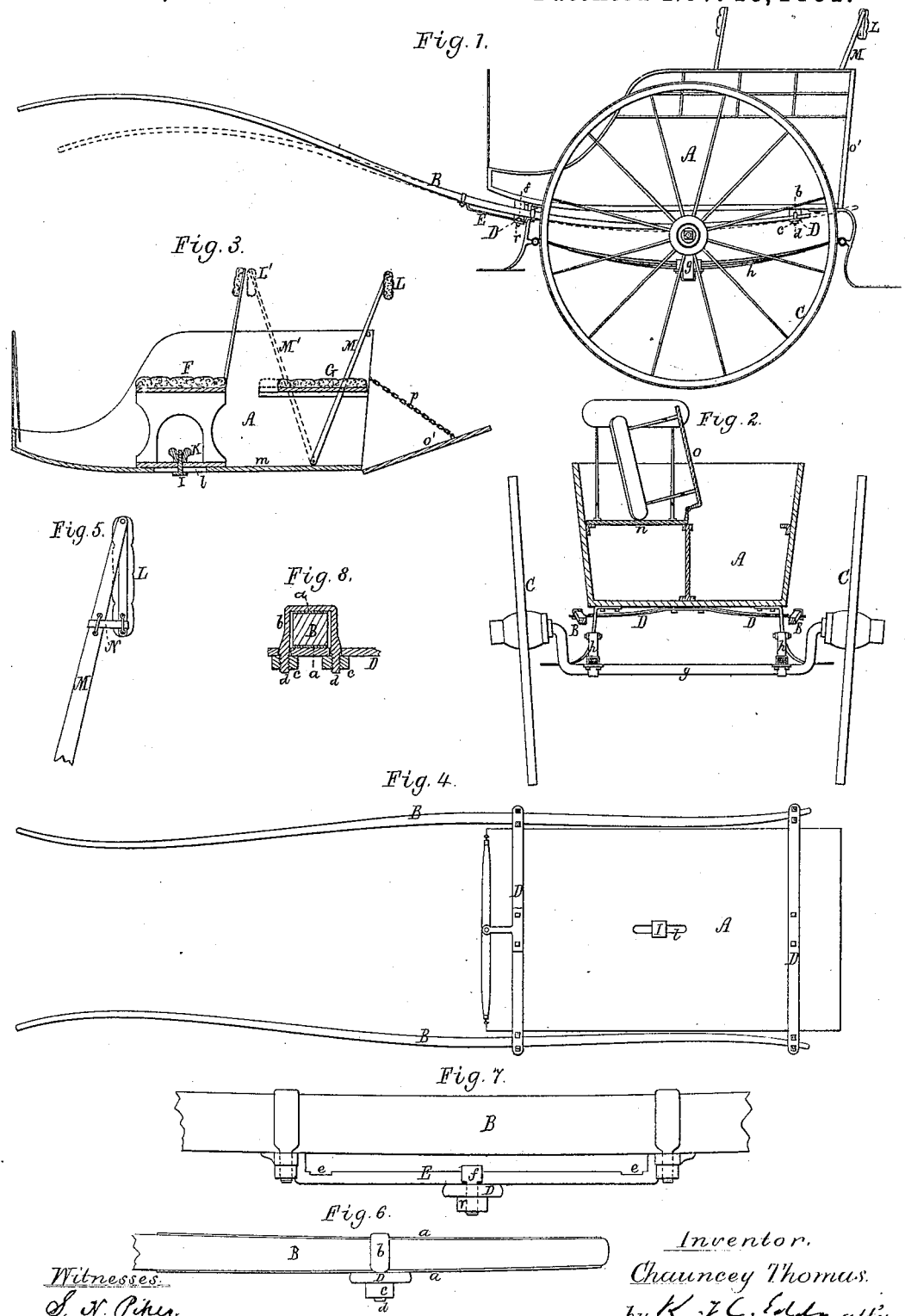
Witnesses
S. N. Piper
E. P. Pratt
Inventor.
Chauncey Thomas.
by K. J. C. Eddy atty.

UNITED STATES PATENT OFFICE.

CHAUNCEY THOMAS, OF BOSTON, MASSACHUSETTS.

TWO-WHEELED VEHICLE.

SPECIFICATION forming part of Letters Patent No. 249,730, dated November 15, 1881.

Application filed October 3, 1881. (No model.)

*To all whom it may concern:*

Be it known that I, CHAUNCEY THOMAS, of Boston, of the county of Suffolk and State of Massachusetts, have invented a new and useful Improvement in Carriages; and I do hereby declare the same to be described in the following specification and represented in the accompanying drawings, of which—

Figure 1 is a side elevation, and Fig. 2 a transverse section, of a carriage containing my invention. Fig. 3 is a longitudinal section of its body. Fig. 4 is a representation of the shafts or thills and their supporting-springs. Fig. 5 is an enlarged view of the rear seat, movable back, and one of its supporters. Figs. 6 and 7 are views, on an enlarged scale, showing means for supporting each of the shafts.

My invention, the nature of which is defined by the claims hereinafter given, has reference to pleasure-carriages known by the term "village-carts," such being two-wheeled vehicles, and generally provided with a front seat and a back seat, the shafts or thills being connected with the body by means of lateral springs attached thereto. Such a carriage is shown in the accompanying drawings, A being the body, B B the thills, and C C the wheels.

The thill-sustaining springs are represented at D D. Each thill is connected with the two springs by means which will enable it to be moved longitudinally of it and fixed in different positions, in order to adapt the thills to either a small or a large horse, as occasion may require. To this end the rear half of each thill is vertically and laterally bowed or curved, in manner as shown in Figs. 1 and 4, in order that on the thill being moved backward to adapt it for use with a pony or small horse the forward half of such thill shall be moved both downward and inward, the thill in such case taking position as represented by the dotted lines in Fig. 1.

In Fig. 6 the rear portion of the thill is shown as re-enforced by a strip, $a$, of metal, arranged on its upper and lower surfaces, such strip being duly fastened to the thill. The thill extends through a screw-clamp, $b$, which straddles the thill, the screws $d$ of the clamp going down through the rear spring D, and being provided with nuts $c$, arranged as shown more especially in Fig. 8, which is a transverse section of the thill and clamp.

The attachment of the thill to the front spring D is shown in Fig. 7, in which the thill is exhibited as provided with a holder, E, shaped as shown, and having in it notches $e\ e$. This holder, fixed to the thill, extends through a bowed screw-clamp, $f$, (like the clamp $b$,) which, arranged in the front spring D, serves, with its nuts $r$, to clamp the holder to the spring. On the thill being moved to its rearmost position the clamp $f$ will enter the forward notch $e$, and, with it and the holder, will, on the nuts being screwed up, serve to retain the thill in such position. On the thill being set in its advance position the clamp $f$ will be within the rearmost notch $e$.

The axle of the carriage is shown at $g$, the body-supporting springs $h\ h$ being at their middles fastened to it, and they at their ends being duly connected with the body.

The fore and back seats are shown at F and G, the seat F—that is, the front one—being movable toward and away from the dasher H, and held in place by one or more clamp-screws and nuts, (represented at I K in Fig. 3,) each screw going through a slot, $l$, made in the floor $m$ of the body.

Sometimes I make the front seat in two parts, $n\ o$, hinged or properly connected together, and provided with separate backs, as shown in Fig. 2, in order to enable one of such parts, with its back, to be turned upward into the position relatively to the other as represented in such figure, such being for convenience of getting to or from the back seat.

The back seat is supported at each end in a groove or upon a cleat, in order for the said seat to be movable forward up to the front seat or sufficiently back therefrom, in order for an occupant of the back seat to set facing or backward relatively to the dasher.

The back of the rear seat is shown at L, it being pivoted at the upper part of each end of it to one of two supporters M, each of which, at its foot, is pivoted to the floor $m$. The back swings between its two supporters, M, and at the lower parts of its ends it is connected with such supporters by short straps N. Such supporters are adapted to the seat G, so as to move with it, in order for the back, when the seat is forward, to be moved into the position as represented at L', in which case the supporter will take position as shown at M'.

The end portion or tail-board, o', of the body, being hinged to the floor m and provided with sustaining-chains p, will, when turned down as shown in Fig. 3, answer as a support for the feet of a person when he may be sitting on the rear seat, G, and such is in its forward position.

By having the front and rear seats adjustable, as described, and the rear seat provided with the movable back and its supporters, as set forth, the front seat can be adjusted relatively to the back seat when the two are in their forward positions.

What I claim as of my invention in the described carriage is as follows, viz:

1. Each thill B, curved laterally and vertically in its rear half, substantially as described, and adapted to its supporting-springs by clamps or fastenings that admit of such thill being moved lengthwise in them, essentially as and for the purpose set forth.

2. The combination of the screw-clamp f and the notched holder E with the thill B and spring D, all being substantially and to operate as set forth.

3. The combination of the carriage-body A, its turn-down tail-board o, adjustable seats F and G, adjustable back L, and its supporters M, all arranged and adapted substantially in manner as set forth.

CHAUNCEY THOMAS.

Witnesses:
R. H. EDDY,
E. B. PRATT.